Dec. 29, 1936.    A. E. ROBINSON    2,066,073
SAFETY DEVICE FOR ELEVATING OR TRANSLATING MECHANISM
Filed Feb. 25, 1936    2 Sheets-Sheet 1

INVENTOR.
Albert E. Robinson
BY
Wood & Wood
ATTORNEYS.

Dec. 29, 1936.    A. E. ROBINSON    2,066,073
SAFETY DEVICE FOR ELEVATING OR TRANSLATING MECHANISM
Filed Feb. 25, 1936    2 Sheets-Sheet 2
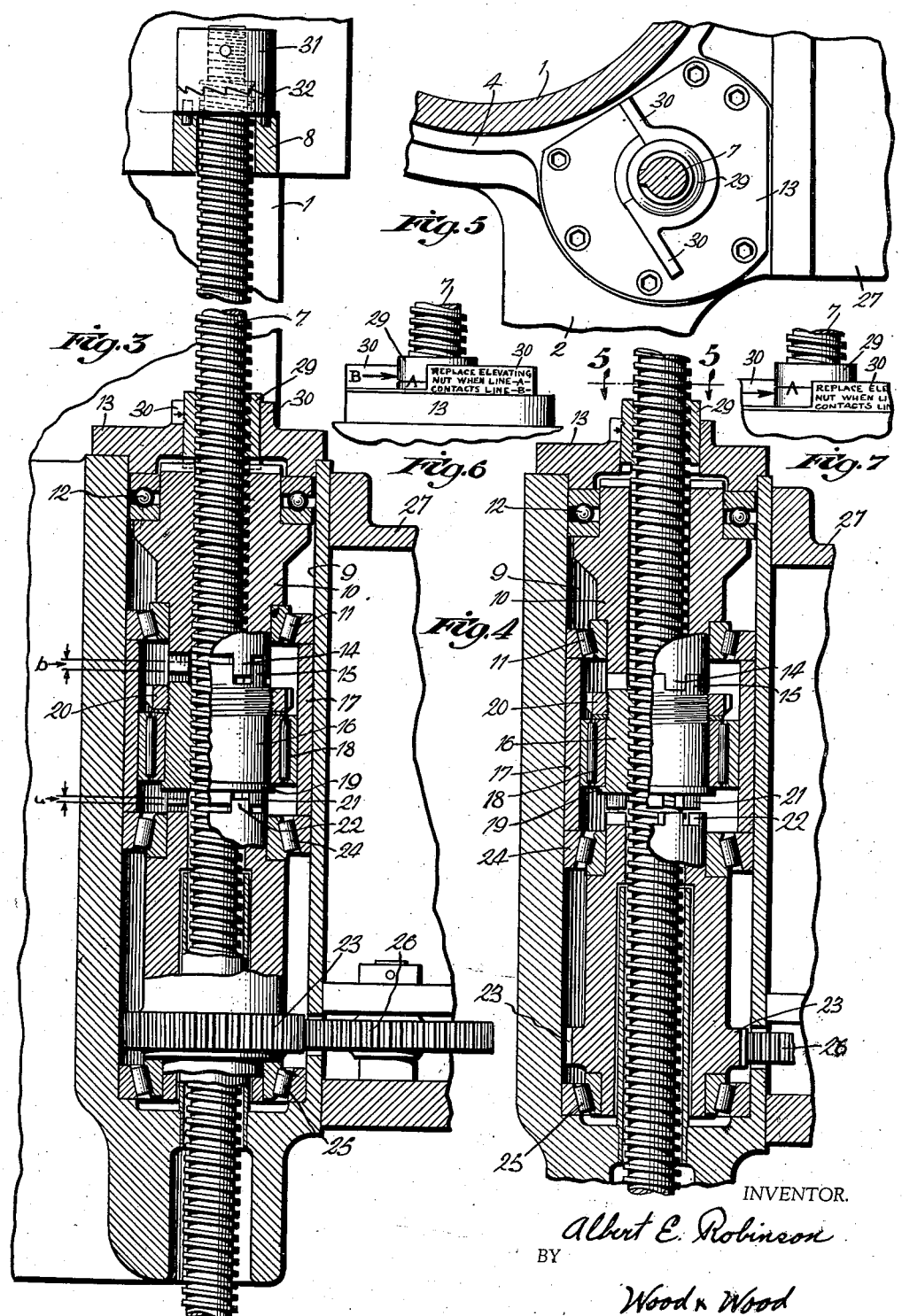
INVENTOR.
Albert E. Robinson
BY
Wood & Wood
ATTORNEYS.

Patented Dec. 29, 1936

2,066,073

UNITED STATES PATENT OFFICE 2,066,073

SAFETY DEVICE FOR ELEVATING OR TRANSLATING MECHANISM

Albert E. Robinson, Cincinnati, Ohio, assignor to The American Tool Works Company, Cincinnati, Ohio, a corporation of Ohio Application February 25, 1936, Serial No. 65,636

7 Claims. (Cl. 74—424.8)

This invention relates to safety devices for elevating or translating mechanism of the screw and nut type, for avoiding accidents in the event of excessive thread wear of the nut, or weakening, so as to no longer sustain the load imposed thereon, and to discommission the same as an elevating or translating mechanism after a determined wear and before the threads are weakened by excessive wear to become unsafe in sustaining or carrying the load.

An object of the invention is to provide a rotatable dual nut for screw elevating and translating devices, self-uncoupling from the power after a certain degree of thread wear of one of the elements exists, so as to no longer be effective as a translating medium, and simultaneously with the ineffectiveness of such element to bring into play or commission a reserve element as a substitute for the worn element to sustain or hold the load, but ineffective as to any translation thereof, necessitating a restoration or replacement of the damaged element before the mechanism is again operative.

Another object of the invention is to provide a screw and nut type of elevating mechanism with means for indicating the degree of thread wear of the nut, so that an attendant can readily and at all times visually note the condition of the nut threads, and which will determinately indicate when a degree of thread wear exists when replacement or repair is advisable and before thread failure destroys the operativeness of the mechanism.

Other objects and further advantages will be more fully apparent from a description of the accompanying drawings, in which:

Figure 3 is an enlarged section on line 3—3, Figure 2.

Figure 4 is a sectional view similar to Figure 3 with the transmission gear for rotating the arm elevating dual nut unclamped therefrom, showing the position of the parts when the threads of the load sustaining member of the dual nut are excessively worn or stripped.

Figure 5 is a section on line 5—5, Figure 4.

Figure 6 is a detail front elevation of the nut wear indicator.

Figure 7 is a view similar to Figure 6, indicating the degree of wear of the load sustaining nut.

The embodiments of the invention, for the purposes of explanation, are shown in an application to a machine tool of the radial drill type, wherein a nut cooperates with the screw for the purpose of translating, as elevating or lowering, an arm, which carries the drilling devices, upon a column or vertical support. The arm, in such types of machines, is of heavy weight and extends horizontally outwardly from the column or support to which it is normally clamped and unclamped therefrom when translated for raising or lowering the working elevation of the arm. In its unclamped position its weight is principally borne by the nut and screw.

In the instance disclosed the screw is stationary and the dual nut rotatable and mounted within the arm in a manner to sustain the same upon the screw, whereby upon rotation of the nut in an appropriate direction the arm is either elevated or lowered according to the selective direction of rotation.

Figure 1:
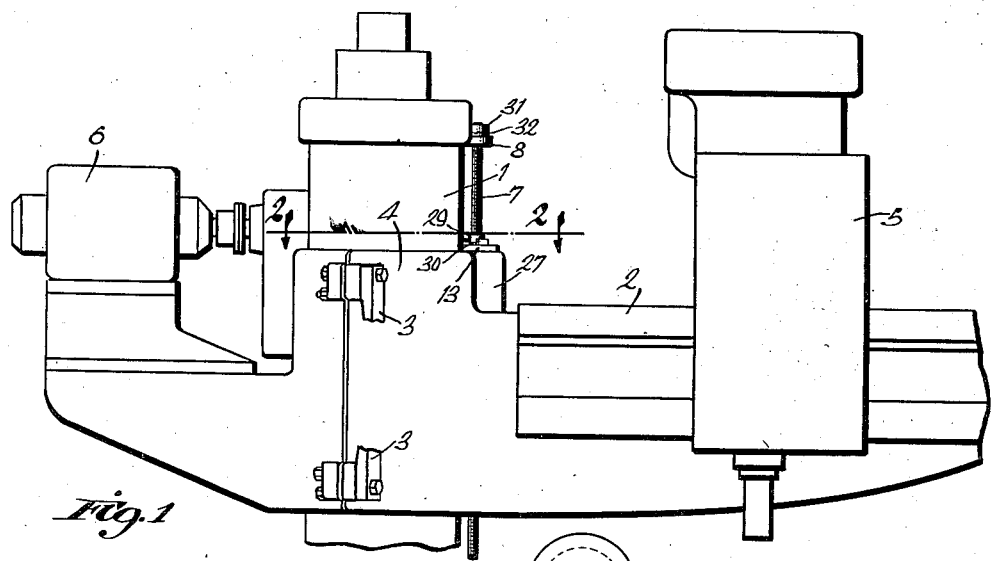
Figure 1 is a front elevation of the major portion of the radial drill arm, mounted upon a vertical column, illustrating one type of machine in which the present invention is applied.
Figure 2:
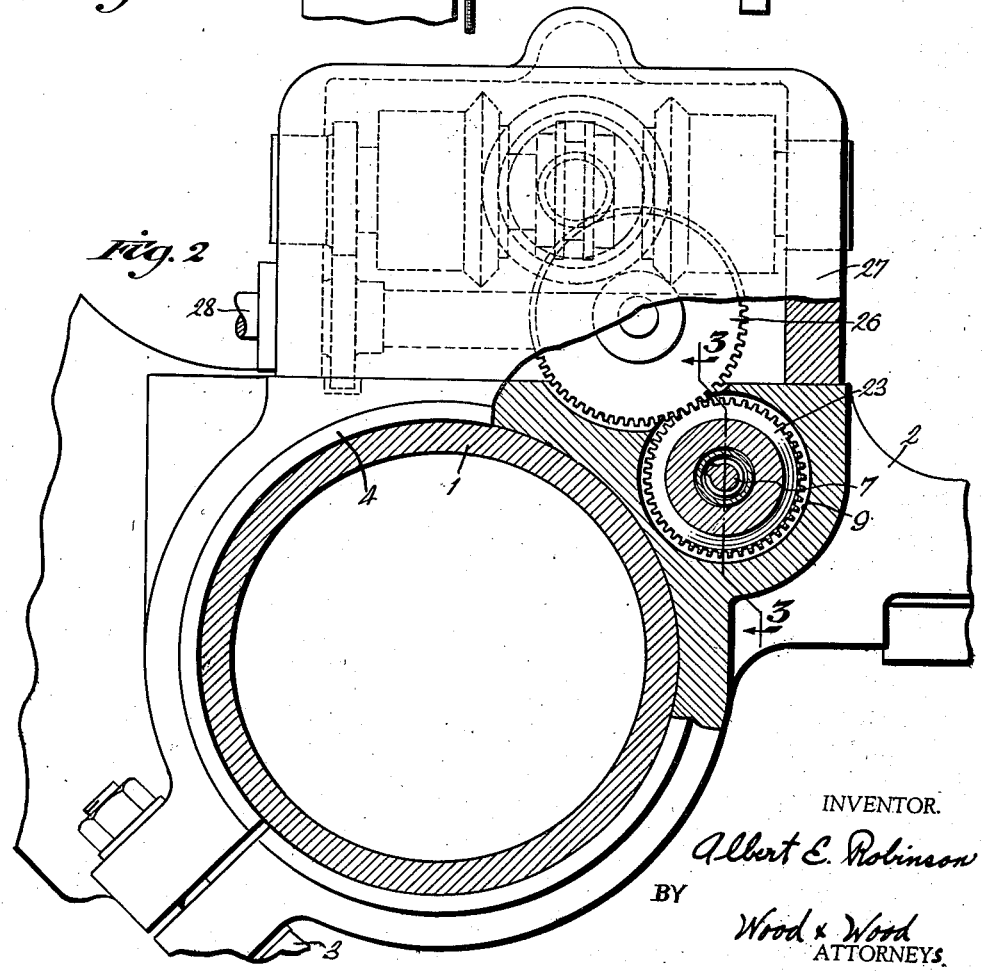
Figure 2 is an enlarged section on line 2—2, Figure 1.

Figures 1 and 2 disclose a portion of a conventional type of radial drill, sufficient for a full concept of the present invention, and upon reference thereto, I indicates a column or vertical sleeve upon which the arm 2, including a collar as an integral part thereof, is slidably mounted. The arm extends horizontally outwardly or laterally from one side of the column or support and carries a head stock 5 translatable horizontally thereon.

The head stock journals a spindle for the drilling tool or tools and supports and houses the gearing or transmission mechanism for driving the spindle. In the present disclosure the arm also extends outwardly from an opposite side of the column to provide a shelf or support for an electric motor 6 as the power driving medium for the arm elevating mechanism, work spindle and other operating parts carried by the arm. In some instances the power is received from the base of the machine and distributed by a series of shafts and gearing to the arm for driving the various working parts thereon.

The arm, in some types of radial drills, is mounted directly upon a column, while in other types it is mounted upon a rotatable sleeve telescopically engaged over a stationary column. The rotatable sleeve type is disclosed herein. This, however is not material to the function or operation of the present invention.

The collar 4, as an integral part of the arm, is split, adapting the same to be frictionally clamped to the sleeve by clamping devices 3—3, relatively disposed toward opposite ends of the collar for compressing or expanding the same for respectively clamping or unclamping the arm upon the sleeve. The arm collar is usually clamped to the sleeve or support during the period that a piece of work is being drilled, and unclamped when translating the arm for adjusting or changing its elevation.

A stationary screw 7 is suspendingly connected or fixed at one end to the top of the sleeve or column or support 1, or to a cap 8 fixed upon the upper end of the sleeve 1. In some instances the screw is rigidly bolted to the cap, while in the manner disclosed the connection provides for rotatively releasing the screw and may be termed a safety connection, the function and benefits thereof being hereinafter described in detail, which, however, is not specifically a part of the present invention.

The screw, in its vertical depending position, traverses the arm, extending through an aperture 9 in the arm, the aperture receiving the dual nut and drive gear therefor as a method of assembling the dual nut and drive gear within the arm, and in sustaining connection therewith. The screw is of an appropriate length for the necessary range of arm elevation adjustment, with its lower end free, following the usual practice.

A dual nut is threaded upon the screw 7, housed and journalled within the aperture 9, and comprises a load bearing or arm elevating nut member 10 in anti-frictional mounting at its lower end on a radial bearing 11 of a roller bearing type, the lower end of the elevating nut 10 being counterturned to receive the bearing in shouldered engagement therewith. The elevating nut member 10 transmits the thrust load through a thrust bearing 12 telescoped upon and in shouldered engagement with the upper counterturned end of the nut, the thrust bearing being of ball type and in thrust contact with the inner side of a cap or thrust plate 13, fixed on the arm, which also serves as a closure for the upper end of the aperture 9.

The lower end of the elevating or primary nut 10 is formed with clutch teeth 14 intermeshed with corresponding clutch teeth 15 upon the upper end of the secondary or coupling nut member 16, for a rotative coupling connection of said nut members and arranged to permit relative axial movement of the two nut members.

The secondary or coupling nut member 16 is rotatively journalled within a spacer sleeve 17 but is free to slide axially therein and is mounted on an anti-friction journal bearing 18 of the roller type, the bearing being axially confined upon the coupling nut member 16 by an annular flange 19 integral with the lower end of the coupling nut member and retainer collar 20, screw threaded upon the upper opposite end of said nut member.

The opposite or lower end of the coupling nut member 16 is provided with clutch teeth 21, normally in mesh with corresponding clutch teeth 22 on the upper hub end of a drive gear 23, mounted in anti-frictional thrust journal bearings 24—25 respectively within the arm aperture 9. The thrust journal bearing 24 is telescoped over the upper end of the drive gear 23 for a shouldered contact therewith and the bearing is in contact with the lower end of the spacer sleeve 17. The bearing 25 likewise is telescoped over the lower hub end of the drive gear 23, to be in shouldered engagement therewith, and seats upon the base wall of the aperture 9.

The primary or elevating nut member 16, spacer sleeve 17, and drive gear 23 are thus mounted within the arm under restraint against axial movement, while the secondary or coupling nut member, having an axial float, can only transmit a torque load, and not being subjected to an axial thrust load, the threads of the coupling nut member 16 will not wear. In its relative clutched or coupling arrangement between the primary elevating nut member and drive gear, it is capable of relative axial motion between said primary or elevating nut member and drive gear so that it can recede to a degree from its coupling connection with the drive gear, according to the thread wear of the elevating nut member 10, so as to be automatically uncoupled from the drive gear upon excessive thread wear of the elevating nut member 10 for stripping of the threads thereof, leaving the drive gear to revolve idly.

If the threads of the elevating nut are worn to such a degree that they can no longer sustain the load of the arm, the load sustension will be transferred upon the coupling nut member 16, which, under such condition, is uncoupled from the drive gear and stationary, so that it will not function for arm elevation or translation but will sustain the arm against drop, avoiding injury thereto and rendering arm elevation impossible until repair of the elevating mechanism is made by replacing the worn elevating nut member 10 and a relative adjustment of the parts for a coupling connection of the dual nut with the drive gear.

In normal operation, before the threads of the elevating nut 10 are worn, the assembly is as shown in Figure 3. The drive gear 23, receiving its motion from a suitable source, as a reversible direction transmission housed upon the rear side of the arm for rotating the drive gear in either forward or reverse directions for selectively raising or lowering the arm, will appropriately rotate the coupling nut member 16 through a coupling connection or clutch tooth connection therewith, and will correspondingly rotate the elevating nut member 10 through the coupling connection of the two nut members.

Wear of the threads in the elevating nut member 10 to an excessive degree, or weakened so that they no longer can carry the weight of the arm or load imposed thereon, and strip, results in a depression of the arm or load and a relative movement of the elevating and coupling nuts or elevating nut and screw, without, however, disturbing a corresponding relativity between the coupling nut member and screw, bringing the elevating and coupling nuts intimately together at their adjoining clutch ends so that the thrust load is transferred upon the coupling nut member through the disabled elevating nut member and its transposition into a strut joining the coupling nut member with the thrust bearing 12 and thrust cap or plate 13, or load.

A recession movement of the arm also causes a relative movement between the coupling nut member and drive gear, resulting in a separation of the coupling connection, leaving the drive gear to revolve idly, with the arm elevating elements out of commission.

It may be noted that the overlap or engagement of the clutch teeth marked (a) for the coupling nut member and drive gear is such that a disengagement may be obtained even through partial wear of the threads of the elevating nut member 10, throwing the elevating nut member out of commission until repaired or replaced. This will avoid wear of the threads of the elevating nut member to a possible degree where they are liable to strip suddenly, causing an abrupt slight drop of the arm or load, which might jam or injure the threads of both the screw and the coupling nut member.

The overlap of the clutch teeth marked (b) for the coupling connection of the elevating and coupling nut members is of such magnitude that a disengagement is impossible.

It is obvious that the mechanism is susceptible to a variety of uses and for different classes of apparatus. For instance, it may be incorporated or may form a part of a lifting jack or platform organization, in which the screw is inaugurated as the translative element, while the nut relatively is stationary.

The characteristics of the dual nut and drive or power element therefor are not altered, although they may require a transposition in arrangement from that herein disclosed. The elements of the dual nut, through their toothed connection, provide for extensibility, or contra, for coupling or uncoupling with the driving gear. The nut elements are always rotatively connected but are capable of relative axial movement, and as thread wear takes place they are brought into a more intimate relation, thus lessening the gap drop of the one on the other in the event of thread failure. The one which has failed becomes a mere inert block which transfers the load to the other. At the same time the dual nut is rendered automatically inactive through its disconnection from the driving gear, which, if its rotation is continued, rotates idly. The parts are very compactly arranged and in their concentric order are conveniently fitted and housed within a radial drill arm or other type of apparatus, and provide for easy and convenient assembly and disassembly.

The drive gear 23 is in mesh with a gear 26 as an element of a direction reversing gear transmission, shown in dotted lines, Figure 2, journalled and housed within a casing 27 fixed to the rear side of the arm, the transmission receiving its power from the electric motor 6 through a drive shaft 28.

To indicate the extent of wear of the threads of the elevating nut member 10, a gauge nut 29, threaded upon the arm elevating screw 7 and journalled in and extending through the thrust cap plate 13, is provided and is in tooth-clutch or coupling connection with the elevating nut member 10. The guide nut is free to float or move axially and any wear of the threads of the elevating nut member 10 causes a corresponding degree of separation between the coupling connection of the gauge nut and elevating nut member.

The periphery of the gauge nut has, circumferentially, an indicator or gauge marked A, cut therein, and is exposed to view within a side gap spacing between the indicator and instruction placards 30—30, as faced flanges or lugs extending upwardly from the upper side of the thrust plate or cap 13, having an indicator or gauge line B cut therein, to which the indicator line or mark A bears a scaling relation for determining thread wear of the elevating nut member 10.

In the particular manner employed, the scale or gauge line A, on the gauge nut 29, is out of registry below the indicator or stationary gauge line B. When the degree of thread wear of the elevating nut member 10 is such as to bring the gauge line A into registration with the gauge line B, it would be desirable to replace the elevating nut member, and when the gauge line A is above the line B, an excessive thread wear or stripping is indicated.

As previously referred to, the upper end of the screw 7 has a safety connection with the cap or top of the column or support or sleeve 1, to prevent undue and careless lowering of the arm to hit an obstruction which might result in an injury to the machine. The upper end of the screw 7 is equipped with a collar 31, fixed thereon, and has a lower serrated or saw-toothed side in registry and interlocking with a correspondingly formed upper side of a collar 32, bearing upon and pinned to a lug or ear of the cap 8, suspendingly supporting the screw normally against rotation.

When the arm, in its descent, strikes an obstruction and arrests the same, the screw is thereupon relieved of the weight of the load of the arm, whereupon the collars 31, 32 will be unclutched, allowing the screw to rotate with the elevating nut, rendering the same ineffective for arm translation in a downward direction. A reclutching of the collars 31, 32 is automatically effected upon reversing the rotation of the elevating nut, raising the arm from the obstruction.

Having described my invention, I claim:

1. A safety device of a character disclosed, comprising, two members, a screw secured to one, a dual nut journalled in the other and threaded on said screw, the elements of said dual nut extensively united for relative axial movement and unitary rotation, adapting the one to normally sustain a load while the second is relieved thereof and substitutes therefor in the event of thread failure of the first, and a drive gear coaxial with said dual nut and in coupling connection therewith when the elements thereof are in an extensible relation and uncoupled therefrom when the elements of the dual nut are brought to a compacted relation.

2. A safety device of a character disclosed, comprising, two members, a screw secured to one, a dual nut journalled in the other and threaded on said screw, the elements of said nut extensively united for relative axial movement and unitary rotation, adapting the one to normally sustain a load while the second is relieved thereof and substitutes therefor in the event of thread failure of the first, and a drive gear coaxial with said dual nut and confined with the first element of the dual nut against relative axial movement and in coupling connection with the second of said dual nut elements, whereby when the dual nut elements are in an extensible relation a coupling connection is effected with said drive gear and uncoupled therefrom when the elements of the dual nut are brought to a compacted relation.

3. A safety device of a character disclosed, comprising, two members, a screw secured to one, a dual nut journalled in the other and threaded on said screw, the elements of said nut extensibly united for relative axial movement and unitary rotation, and adapting the one to normally sustain a load while the second is relieved thereof and substitutes therefor in the event of thread failure of the first, and a drive gear coaxial with said dual nut and in coupling connection with the second element of said dual nut and adapted to be uncoupled therefrom when said dual nut element assumes a compacted relation.

4. A safety elevating mechanism comprising a support, a dual nut journalled in said support, a screw traversing said dual nut and in threaded engagement therewith, said dual nut constituting a first thrust bearing nut and a second normally non-thrust bearing nut extensibly united for relative axial movement and unitary rotation, said second nut adapted to receive the thrust through the first in the event of failure of the first, and drive means for rotating said dual nut.

5. A safety elevating mechanism comprising a support, a dual nut journalled in said support, a screw traversing said dual nut and in threaded engagement therewith, said dual nut constituting a first thrust bearing nut and a second normally non-thrust bearing nut extensibly united for relative axial movement and unitary rotation, said second nut adapted to receive the thrust through the first in the event of failure of the first, drive means for rotating said dual nut, an indicator sleeve threaded upon said screw in extensible coupling connection with the first nut element of said dual nut, having a circumference indicator mark about its exterior surface, and an indicator carried by said dual nut support, co-ordinating with said circumference indicator mark for denoting the degree of thread wear of said thrust bearing nut.

6. A safety elevating mechanism for a radial drill arm, comprising, a column or support, an arm slidably mounted on said support, a dual nut journalled in an aperture in said arm, a screw suspendingly supported from said column or support, traversing said dual nut and arm and in threaded engagement with said dual nut, constituting a first nut element in thrust engagement with the arm and a second nut element extensibly and rotatively coupled to said first nut element and adapted to receive the thrust through said first nut element in the event of thread failure of said first nut element, and a drive gear journaled in said aperture in said arm coaxially with said dual nut and in coupling connection with said second nut element.

7. A safety elevating mechanism for a radial drill arm, comprising, a column or support, an arm slidably mounted on said support, a dual nut journalled in an aperture in said arm, a screw suspendingly supported from said column or support, traversing said dual nut and arm and in threaded engagement with said dual nut, constituting a first nut element in thrust engagement with the arm and a second nut element extensibly and rotatively coupled to said first nut element and adapted to receive the thrust through said first nut element in the event of thread failure of said first nut element, a drive gear journalled in thrust bearings in said aperture in said arm, coaxially with said dual nut and in coupling connection with said second nut element, and a spacer sleeve disposed between said drive gear and first nut element to axially confine the same, and enveloping the second nut element.

ALBERT E. ROBINSON.